Jan. 2, 1934.  F. T. COURT ET AL  1,941,539
ROD WEEDER
Filed Nov. 3, 1930
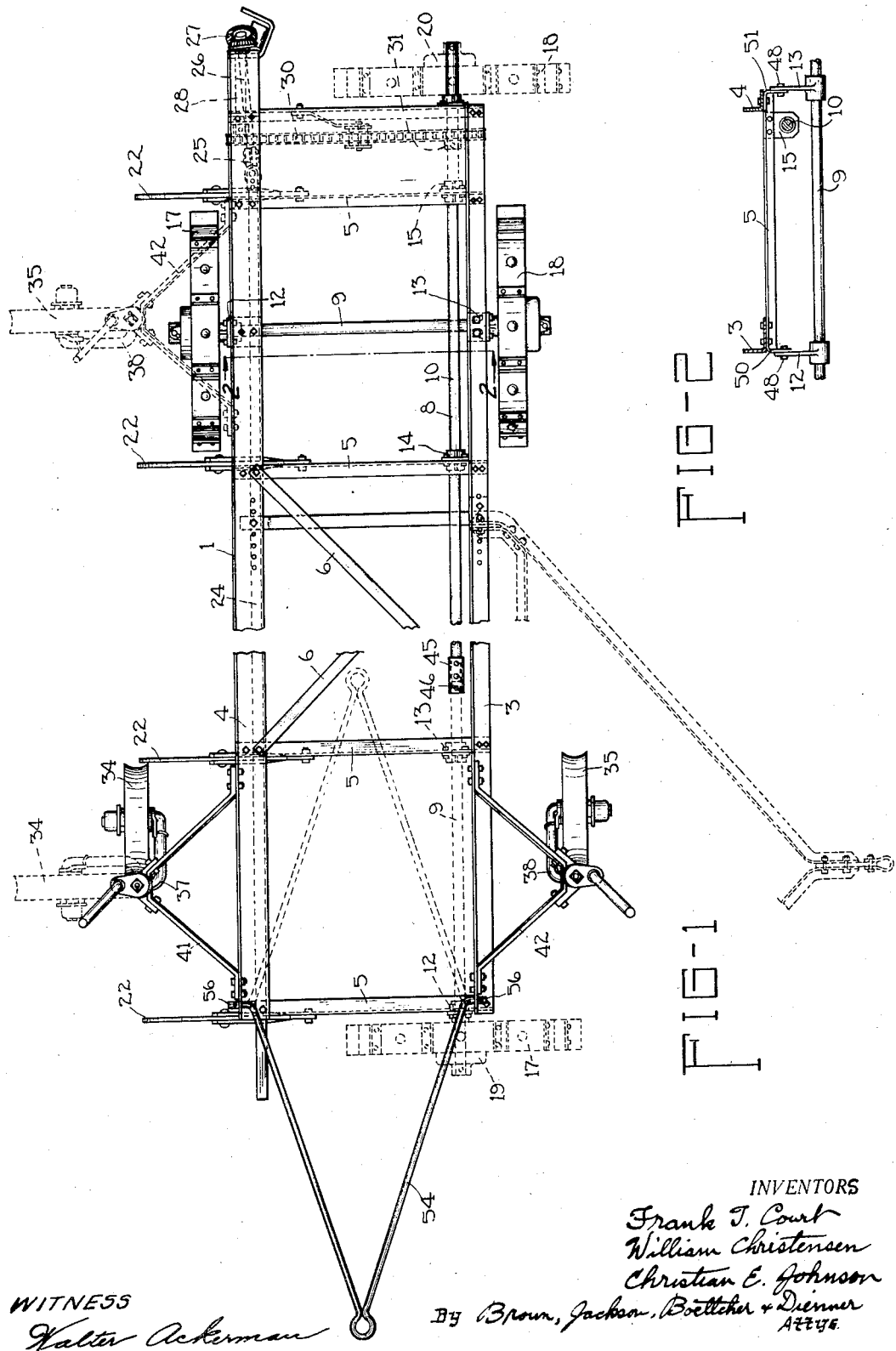
WITNESS
Walter Ackerman
INVENTORS
Frank T. Court
William Christensen
Christian E. Johnson
By Brown, Jackson, Boettcher & Dienner
ATTYS.

Patented Jan. 2, 1934

1,941,539

UNITED STATES PATENT OFFICE 1,941,539

ROD WEEDER

Frank T. Court, William Christensen, and Christian E. Johnson, Moline, Ill., assignors to Deere & Company, Moline, Ill., a corporation of Illinois Application November 3, 1930. Serial No. 492,930

21 Claims. (Cl. 97—42)

The present invention relates to agricultural implements, and more particularly to rod weeders and a means and method for arranging such implements for transport from one field to another, or along highways and the like.

With the increased use of power apparatus on farms, there has come about an increase in the size and width of the agricultural implements adapted to be used with such apparatus, such as power operated tractors and the like. With the increase in the width of such implements, particularly rod weeders, manufacturers have been confronted with the problem of arranging or adapting such implements so that they can be readily drawn along a highway, through gates, and around and into the various farm buildings. Heretofore, in some instances, small transport trucks have been furnished on which the implement could be positioned so as to transport the same with its frame endwise, similar to the manner in which it is common at present to transport a grain binder and similar implements. Such construction, however, involves additional axles, wheels, attaching means, and the like which are used only when moving the implement and which quite naturally adds a considerable sum to the manufacturing cost and selling price of the implement.

It is one object, therefore, of the present invention to obviate some of the defects of the prior art in this respect and to provide in such implements, particularly a rod weeder, a wheeled supporting and driving structure which is capable of supporting and driving the implement when in operation and yet capable of being arranged in positions at right angles to the normal operative positions for transport purposes without involving the addition of superfluous parts. More particularly, the present invention has for one of its objects the provision of a supporting means for the wheels of a rod weeder which is so constructed and arranged that the wheels thereof may be positioned to allow the implement to be moved endwise, thus reducing the overall width of the implement when moving the same, without requiring any substantial number of extra parts or the like.

Another object of the present invention relates to an improved driving means for the rotatable rod of a rod weeder so that power may be delivered to the rod from both of the driving wheels.

Other objects and advantages of the present invention will be apparent to those skilled in the art after a consideration of the following detailed description of the preferred embodiment, taken in conjunction with the accompanying drawing in which:—

Figure 1 is a top plan view showing a rod weeder incorporating the features of the present invention, the full line position of the parts indicating the arrangement of the implement when it is adapted to be transported while the dotted line position of the parts indicates the arrangement when the implement is in its operative or working position; and Figure 2 is a detail sectional view taken substantially along the line 2—2 of Figure 1.

Referring now to the drawing, the reference numeral 1 indicates, in its entirety, the elongated frame of the rod weeder, and from Figure 1 it will be observed that the frame 1 comprises a front angle bar 3, a rear angle bar 4, fore and aft extending members 5 joining the front and rear bars, and cross braces 6. As is usual in such framework, the member 5 and the cross braces 6 reinforce the frame 1 against distortion under the forces imposed during the operation of the device.

Extending longitudinally of the elongated frame 1 is a sectionalized driving shaft or through axle 8 comprising sections 9 and 10. Bearing means in the form of journal brackets 12, 13, 14 and 15 are provided for supporting the driving shaft 8, and these bearing members are preferably adapted to be secured to the vertical legs of the frame members or angle irons 5.

The driving shaft 8 is adapted to extend beyond the ends of the frame 1 to receive the driving wheels 17 and 18, as shown in dotted lines in Figure 1. Preferably, these driving wheels 17 and 18 are provided with ratchet mechanism 19 and 20 which are arranged to allow the driving shaft 8 to overrun either of the wheels 17 and 18, but providing for a driving connection between either or both of the wheels and the shaft.

Goose necks 22 are secured to the rear part of the frame 1, preferably the rear bar 4 and the associated members 5, and these goose necks 22 receive and support the rotatable weeder rod 24 in the usual manner. One end of the weeder rod 24 is provided with a universal joint 25 and a short shaft section 26 which is driven by means of intermeshing gears 27 from a second short shaft section 28 journaled on the rear frame bar 4. The shaft 28 is driven by means of a sprocket chain 30 trained over and driven by a sprocket gear 31 fixed or otherwise secured to the driving shaft 8 in the usual manner.

From Figure 1 it will be noted that the driving wheels 17 and 18 are arranged adjacent the front bar 3. The rear of the elongated frame 1 is supported by a pair of caster wheels 34 and 35 provided with the usual vertical spindle structure and crank axle arrangement 37 and 38, respectively. The vertical spindles of each of the caster wheels 34 and 35 are journaled in castings secured respectively to triangular brackets 41 and 42. These brackets may be bolted or otherwise detachably secured to the rear frame bar 4 of the frame 1.

The above description is applicable to the rod weeder when it is arranged for operative or working position, and in which some of the parts are shown in dotted lines as pointed out above. When the implement is to be arranged for transport, such as accomplished by simply rearranging a few of the parts of the implement as will be clear from the following description. The draft frame, shown in dotted lines, by which the implement is pulled in its working position, is disconnected and laid on top of the frame of the implement, and the right hand triangular bracket 42 is removed from its position at the rear of the weeder and is attached to the front bar 3 at a position substantially opposite the caster wheel 34 and the associated supporting bracket 21. This is the full line position as indicated in Figure 1. To transport the weeder so that the frame 1 is moved endwise, it is only necessary to rearrange the mounting for the drive wheels 17 and 18. This is accomplished by detaching these drive wheels from their driving positions, as shown in dotted lines, and mounting them in their transport position, as shown in full lines.

To provide for this rearrangement the drive shaft or through axle 8 is made in separable sections 9 and 10 and the section 9 is adapted to be removed, together with the associated bearing brackets 12 and 13, and to be attached to the end of the frame 1 from which the caster wheel structure 35 was removed. The shaft section 9 is connected to the section 10 by means of a sleeve 45 pinned or otherwise secured to the section 10 and which is adapted to receive the section 9 and to which it is adapted to be connected by means of a removable cotter pin 46 or an equivalent structure.

When it is desired, therefore, to transport the implement it is a simple matter to remove the cotter pin 46 and the bolts 48 securing the bearing or journal members 12 and 13 to the frame members 5, and place the shaft section 9 and wheel 17 in position under one end of the frame 1, bolting the bearing or journal brackets 12 and 13 to the vertical legs of clips 50 and 51 secured respectively to the frame bars 3 and 4 for this purpose. Lastly, the other driving wheel 18 is removed from the outer end of the shaft section 10 and is replaced on the end of the shaft section 9 extending outwardly of the frame bar 3. The implement is then arranged for transport, and if desired, a draft member 54 may be especially provided for drawing the implement. As shown in Figure 1, this draft member 54 is in the form of a V-shaped rod provided with turned ends 55 and 56 which hook into perforations in one end of the members 3 and 4. During operative or working arrangement of the implement, the draft member 54 normally lays back across the second frame member 5.

It is important that the shaft section 9 is made just the right length so that it will extend outwardly beyond each of the frame members or bars 3 and 4 to conveniently accommodate the driving wheels 17 and 18, the driving wheels being secured to the shaft section 9 in substantially the same manner they are secured to the driving shaft 8. As a matter of fact, it is unnecessary to detach the driving wheel 17 from the shaft section 9, but it is necessary to detach the driving wheel 18 from the shaft section 10 and to attach that wheel to the other end of the shaft section 9.

When the implement is arranged for transport, as shown in full lines in Figure 1, and since the caster wheels 34 and 35 are capable of swinging through an angle of at least 90°, as soon as the draft is applied to the draft member 54 the caster wheels swing around to the position shown in full lines in Figure 1. The implement then becomes a four wheel truck supported on two caster wheels at the front end and on wheels 17 and 18 mounted on a through axle at the rear.

While we have shown and described in connection with the accompanying drawing the preferred embodiment of the present invention, it is to be understood that our invention is not to be limited to the specific means shown and described, but that, in fact, widely different means may be employed in the practice of the broader aspects of our invention.

What we claim and desire to secure by Letters Patent is:—

1. An implement comprising an elongated frame, supporting wheels for said frame, said wheels including caster wheels and drive wheels, detachable bracket means for mounting certain of the caster wheels in two positions on said frame, and detachable bearing means for mounting the drive wheels in two positions on the frame, whereby said implement may be optionally transported either transversely or longitudinally.

2. An implement comprising an elongated frame, supporting wheels for said frame, said wheels including caster wheels and drive wheels, a sectional shaft associated with said drive wheels and including a detachable section, detachable bearing means for said section, detachable bracket means for mounting certain of the caster wheels in two positions on said frame, said detachable bearing means attachable to the frame in a plurality of positions and said section adapted to receive the drive wheels in one position, whereby said implement may be optionally transported either transversely or longitudinally.

3. An implement adapted to be transported endwise when in non-operative position and sidewise when in operative position, said implement comprising an elongated frame having a pair of drive wheels at the ends thereof and a pair of caster wheels at the rear side when the implement is arranged for operation, removable bracket means for supporting one of said caster wheels and adapted to optionally mount said one caster wheel at said rear side or on the front of said frame and opposite the other caster wheel, means for optionally supporting the drive wheels at opposite ends of the frame or on opposite sides at one end thereof, and draft means for applying a draft force to one end of the frame.

4. An implement adapted to be optionally transported either in endwise relation or sidewise relation, said implement comprising an elongated frame having a pair of supporting wheels at the ends thereof and a pair of supporting wheels at the rear side when the implement is arranged for sidewise transportation, removable bracket means for supporting one of said wheels at the rear side of the frame and adapted to optionally mount said one wheel at the rear side or at the front side of the frame, means for optionally supporting the first named wheels at opposite ends of the frame or on opposite sides of the frame spaced longitudinally of the frame from the other wheels, and draft means for said frame.

5. An implement adapted to be optionally arranged for either endwise or sidewise transportation, said implement comprising an elongated frame having a pair of supporting wheels at the ends thereof and a pair of supporting wheels at one side of the frame when the implement is arranged for sidewise transportation, a detachable bracket for mounting one of the second pair of wheels and adapted to be removed from said one side of the frame and to mount said one wheel on the other side of the frame, and means for optionally supporting the first pair of wheels either on the ends of the frame or at opposite sides thereof and spaced longitudinally of the frame from said second pair of wheels.

6. An implement adapted to be optionally arranged for either endwise or sidewise transportation, said implement comprising an elongated frame having a pair of supporting wheels at the ends thereof and a pair of supporting wheels at one side of the frame when the implement is arranged for sidewise transportation, a detachable bracket for mounting one of the second pair of wheels and adapted to be removed from said one side of the frame and to mount said one wheel on the other side of the frame, and means for optionally supporting the first pair of wheels either on the ends of the frame or at opposite sides thereof and spaced longitudinally of the frame from said second pair of wheels, said last named means including a driving shaft section connected with one of the end wheels and adapted for journal support on said frame in both positions of said first mentioned end wheels.

7. An agricultural implement comprising an elongated frame having supporting wheels at the ends thereof, axle means including a shaft section associated with at least one of the wheels, and bearing means for mounting the shaft section on the frame, said bearing means being detachable from the frame and adapted to mount the shaft section at another position on the frame whereby the wheels may be placed at the sides of the frame.

8. An agricultural implement comprising a frame, operating mechanism carried thereby, driving wheels for said implement, means including a sectionalized shaft for driving the mechanism from said wheels, detachable bearing means mounting one section of said shaft, said detachable bearing means being attachable to another part of the frame whereby the shaft section is adapted to receive said driving wheels when the implement is arranged for transport.

9. A rod weeder comprising, an elongated frame, a weeder rod rotatably carried by said frame, a sectional through axle journaled on said frame and operatively arranged to drive said rod, and driving wheels connected with the ends of said axle and provided with ratchet means allowing the axle to overrun the wheels but establishing a driving connection between the wheels and the axle, one of the sections of said shaft being removable and adapted to be attached to another part of the frame and to receive said driving wheels whereby said weeder is arranged for transport.

10. A rod weeder comprising an elongated frame including front and rear bars and reinforcing members joining said bars, a rotatable weeder rod and means journaling the rod on said frame, driving means for said rod including drive wheels, a separable shaft connected at its ends with the wheels, and bearing means for said separable shaft adapted to be optionally attached to said members or to said front and rear bars, said bearing means when in the latter position receiving one of the sections of said separable shaft and adapted to mount said section with the ends thereof extending beyond said front and rear bars, said driving wheels being attachable to said section when so arranged, whereby the weeder is adapted to be transported, and separate supporting wheels mounted on the frame, one of said supporting wheels being attachable to the frame at different points to accommodate the optional arrangement of said shaft section.

11. An agricultural implement comprising an elongated frame having supporting wheels, shaft means associated with the wheels and including a shaft section, and bearing means for mounting the shaft section on the frame, said bearing means being detachable from the frame and adapted to mount the shaft section at another position on the frame.

12. An implement comprising an elongated frame generally arranged transversely with respect to the line of advance in operation, supporting wheels for the frame including wheels disposed adjacent either end of said frame when arranged transversely, detachable bracket means for mounting one of said wheels, said detachable bracket means being adapted to be detached from one end of said frame and shifted relative thereto and disposed adjacent the other end of said frame to dispose both of said wheels near one end of the frame when arranged for transport, and shiftable means for mounting other of said wheels in at least two positions relatively to the frame, whereby said implement may be optionally transported either transversely or longitudinally.

13. An implement comprising an elongated frame, supporting wheels for the frame including at least one drive wheel and a pair of non-driving wheels, said latter wheels being adapted to be disposed adjacent the ends of said elongated frame when the latter is arranged transversely with respect to the line of advance, detachable bracket means for mounting one of said non-driving wheels, said bracket means being detachable from the frame and shiftable relative thereto and adapted to be secured to the frame adjacent the other end, whereby said non-driving wheels may be secured to the frame adjacent one end thereof, and shiftable mounting means for said driving wheel movable to two positions on the frame, whereby said implement may be optionally transported either transversely or longitudinally.

14. An implement comprising an elongated frame including a pair of frame bars, supporting wheels for the frame including at least one drive wheel and a pair of non-driving wheels, bracket means for mounting the non-driving wheels one adjacent either end of said frame, said bracket means being secured to one of said frame bars, one of said bracket means being detachable from the frame and adapted to be shifted to a position adjacent the end near which the other bracket means is secured and to be secured to the other frame bar to dispose both of said non-driving wheels adjacent one end of the frame, and shiftable means for mounting the drive wheel in two positions on the frame, whereby said implement may be optionally transported either transversely or longitudinally.

15. An implement comprising an elongated frame including a pair of frame bars, supporting wheels for the frame including a pair of wheels adapted to be disposed one adjacent either end of the frame, bracket means for said wheels secured near the ends of one of said frame bars, one of said bracket means being detachable from said one frame bar and shiftable to another position relative to the frame and adapted to be attached to the other frame bar adjacent the end to which the other bracket means is secured, both of said wheels being caster wheels, and means for supporting one end of the frame when said caster wheels are arranged adjacent the other end.

16. An implement comprising an elongated frame, a pair of transversely disposed shafts on opposite sides of the frame, a wheel on the outer end of each shaft, and separate means for supporting each shaft on the frame, the means supporting one of said shafts comprising a pair of bearings adapted to be optionally attached to said frame in alignment transversely of said frame or longitudinally of said frame, said bearings when in the latter position receiving one of said shafts with the ends thereof extending beyond the front and rear of said frame, said wheels being attachable to said one of said shafts when so arranged, whereby the implement is adapted to be transported.

17. An implement comprising an elongated frame, a pair of transversely disposed shafts on opposite sides of the frame, a wheel on the outer end of each shaft, separate means for supporting each shaft on the frame, the means supporting one of said shafts comprising a pair of bearings adapted to be optionally attached to said frame in alignment transversely of said frame or longitudinally of said frame, said bearings when in the latter position receiving one of said shafts with the ends thereof extending beyond the front and rear of said frame, said wheels being attachable to said one of said shafts when so arranged, whereby the implement is adapted to be transported, and separate supporting wheels mounted on the frame, one of said supporting wheels being attachable to the frame at different points to accommodate the optional arrangement of said one of said shafts.

18. A rod weeder comprising an elongated frame including front and rear bars and a reinforcing member joining said bars, a rotatable weeder rod and means journaling the rod on said frame, a pair of transversely disposed shafts on opposite sides of the frame, a wheel on the outer end of each shaft, driving means for said rod including at least one of said wheels, separate means for supporting each shaft on the frame, the means supporting one of said shafts comprising bearing means adapted to be optionally attached to said member or to said front and rear bars, said bearing means when in the latter position receiving said one of said shafts with the ends thereof extending beyond said front and rear bars, said wheels being attachable to said one of said shafts when so arranged, whereby the weeder is adapted to be transported, and separate supporting wheels mounted on the frame, one of said supporting wheels being attachable to the frame at different points to accommodate the optional arrangement of said one of said shafts.

19. An agricultural implement comprising an elongated frame having supporting wheels at the ends thereof, means including a shaft section associated with the wheels and adapted to mount the same at the ends of the frame, and bearing means for mounting the shaft section on the frame, said bearing means being detachable from the frame and adapted to mount the shaft section at another position on the frame transversely thereof, whereby the wheels may be mounted on the ends of said section and at the sides of the frame.

20. In an agricultural implement comprising an elongated frame having supporting wheels at the ends thereof, a shaft section having one of said wheels mounted on one end thereof, means for mounting said shaft section on the frame to dispose said wheel at one side of the frame, means for supporting another of said wheels at the other side of the frame, said shaft section being detachable from the frame, and means arranged to mount the detachable shaft section at another position on the frame to receive said other wheel at its other end, whereby said wheels may be placed at the sides of the frame.

21. In an agricultural implement comprising an elongated frame having supporting wheels at the ends thereof, a shaft section having one of said wheels mounted on one end thereof, bearing means for mounting said shaft section on the frame to dispose said wheel at one side of the frame, and other means for supporting another of said wheels at the other side of the frame, said bearing means being detachable from the frame and adapted to mount the shaft section at another position on the frame and being adapted to receive said other wheel on its other end whereby the wheels may be placed at the sides of the frame.

FRANK T. COURT.
WILLIAM CHRISTENSEN.
CHRISTIAN E. JOHNSON.